United States Patent
Giesel

(10) Patent No.: US 11,000,929 B2
(45) Date of Patent: May 11, 2021

(54) MACHINING DEVICE AND METHOD FOR MACHINING A ROTOR ARRANGED IN A TURBINE HOUSING WHICH CONSISTS OF TWO PARTS, THEREBY FORMING A JOINT, AND METHOD FOR REPAIRING AND/OR RETROFITTING A TURBINE

(71) Applicant: SIEMENS AKTIENGESELLSCHAFT, Munich (DE)

(72) Inventor: Rick Giesel, Essen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 134 days.

(21) Appl. No.: 16/330,150

(22) PCT Filed: Aug. 8, 2017

(86) PCT No.: PCT/EP2017/069994
§ 371 (c)(1),
(2) Date: Mar. 4, 2019

(87) PCT Pub. No.: WO2018/046209
PCT Pub. Date: Mar. 15, 2018

(65) Prior Publication Data
US 2019/0184510 A1 Jun. 20, 2019

(30) Foreign Application Priority Data
Sep. 6, 2016 (DE) ...................... 10 2016 216 857.6

(51) Int. Cl.
*B23Q 11/00* (2006.01)
*B23P 6/00* (2006.01)
(Continued)

(52) U.S. Cl.
CPC ............ *B23Q 11/001* (2013.01); *B23P 6/002* (2013.01); *B23Q 9/0042* (2013.01);
(Continued)

(58) Field of Classification Search
CPC .............. B23Q 11/001; B23Q 11/0032; B23Q 11/0046; B23Q 9/0042; B23P 6/002;
(Continued)

(56) References Cited

U.S. PATENT DOCUMENTS 9,097,123 B2 * 8/2015 Holmes ................. F01D 25/285
2008/0271315 A1 * 11/2008 Nguyen ................. B23Q 9/005
29/889.2
(Continued)

FOREIGN PATENT DOCUMENTS

EP    1987915 A1    11/2008
EP    3006160 A1    4/2016
(Continued)

OTHER PUBLICATIONS

Office Action in corresponding Korean Patent Application No. 10-2019-7009425 dated Jun. 29, 2020. 20 pages.
(Continued)

*Primary Examiner* — Lawrence Averick
(74) *Attorney, Agent, or Firm* — Schmeiser, Olsen & Watts LLP

(57) ABSTRACT

Provided is a machining device for machining a rotor arranged in a turbine housing which includes two parts, thereby forming a joint, in situ while the upper housing half is removed. The machining device includes a main part that releasably secures the main part to the lower housing half in the region of the joint, at least one tool holder for receiving at least one machining tool which is secured on the main part directly or indirectly so as to be alignable relative to the main part, multiple telescopic stabilizing elements which
(Continued)

can be locked into different longitudinal settings preferably in a continuous manner.

11 Claims, 13 Drawing Sheets

(51) Int. Cl.
  *F01D 25/28* (2006.01)
  *F01D 25/24* (2006.01)
  *B23Q 9/00* (2006.01)
  *F01D 5/30* (2006.01)
  *G01B 11/02* (2006.01)
  *G01B 11/22* (2006.01)
(52) U.S. Cl.
  CPC ...... *B23Q 11/0032* (2013.01); *B23Q 11/0046* (2013.01); *F01D 5/3007* (2013.01); *F01D 25/24* (2013.01); *F01D 25/285* (2013.01); *G01B 11/02* (2013.01); *G01B 11/22* (2013.01)
(58) Field of Classification Search
  CPC ...... F01D 5/3007; F01D 25/285; F01D 25/24; G01B 11/02; G01B 11/22
  See application file for complete search history.

(56) References Cited

U.S. PATENT DOCUMENTS

| | | | | |
|---|---|---|---|---|
| 2011/0185570 | A1* | 8/2011 | Bird | F01D 5/005 29/888.021 |
| 2013/0289766 | A1* | 10/2013 | Hafenrichter | B25J 5/00 700/245 |
| 2014/0134926 | A1* | 5/2014 | Groppe | B24B 19/14 451/28 |
| 2016/0096249 | A1* | 4/2016 | Visajtaev | B24B 19/02 451/439 |

FOREIGN PATENT DOCUMENTS

| | | |
|---|---|---|
| KR | 20140061252 A | 5/2014 |
| WO | 2018046209 A1 | 3/2018 |
| WO | WO 2018046209 A1 | 3/2018 |

OTHER PUBLICATIONS

PCT International Search Report and Written Opinion of International Searching Authority dated Jan. 17, 2018 corresponding to PCT International Application No. PCT/EP2017/069994 filed Aug. 8, 2017.

* cited by examiner

MACHINING DEVICE AND METHOD FOR MACHINING A ROTOR ARRANGED IN A TURBINE HOUSING WHICH CONSISTS OF TWO PARTS, THEREBY FORMING A JOINT, AND METHOD FOR REPAIRING AND/OR RETROFITTING A TURBINE

CROSS-REFERENCE TO RELATED APPLICATIONS

This application claims priority to PCT Application No. PCT/EP2017/069994, having a filing date of Aug. 8, 2017, based on German Application No. 102016216857.6, having a filing date of Sep. 6, 2016, the entire contents both of which are hereby incorporated by reference.

FIELD OF TECHNOLOGY

The following relates to a machining device and to a method for machining a rotor arranged in a turbine housing which consists of two parts, thereby forming a parting joint. Furthermore, the following relates to a method for repairing and/or retrofitting a turbine.

BACKGROUND

It has been shown that it may be necessary to subsequently machine a rotor, especially mechanically, which is installed in a turbine, such as a gas turbine, and in particular which was already in operation, or to machine components of such a rotor. This is associated with considerable cost since for the subsequent machining of the rotor the turbine housing has to be opened and the rotor has to be removed. Following the removal, the rotor-for example for a mechanical machining by turning or milling—has to be positioned on a work bench, possibly in the factory in which the production of the rotor was carried out, which in addition is associated with costly transportation. Depending on what is to be machined, a complete de-stacking of the rotor may also be required. This entire process costs a great deal of time and manpower and is correspondingly expensive.

SUMMARY

An aspect relates to a machining device by means of which machining of a rotor after its installation in a turbine is possible with reduced cost in comparison to the prior art. A further aspect involves specifying a method in the course of which a rotor which is already installed can be machined with reduced cost.

Another aspect relates to a machining device for the machining in situ of a rotor arranged in a turbine housing which consists of two parts, thereby forming a parting joint, with the upper housing half removed, comprising
  a basic body, which has fastening means for the releasable fastening of the basic body on the lower housing half in the region of the parting joint,
  at least one tool holder for accommodating at least one machining tool, which is fastened directly or indirectly on the basic body and can be aligned, preferably along at least two axes, relative to the basic body,
  a plurality of telescopically designed stabilizing elements which can be locked, preferably in a stepless manner, in various length adjustments, one free end of which in each case is fastened in an articulated manner on the basic body and which on their other free ends are provided with additional fastening means which are designed in such a way that the free ends can be fastened in a releasable and articulated manner on the lower half of the turbine housing.

The basic idea of the embodiments of the invention involves providing a suitable machining device with at least one machining tool, which device, with the upper housing half of the turbine and especially rotor blades and/or stator blades or the entire guide vane apparatus removed, is installed on the lower housing half for the duration of the necessary aftermachining in order to machine the rotor in situ. Removal of the rotor as a consequence of this is no longer necessary, as a result of which the effort and therefore the costs which are associated with the machining can be appreciably reduced.

The machining device according to the embodiments of the invention comprises a basic body, for example produced from metal, which can be temporarily fixed via suitable fastening means, for example fastened by screws, on the lower housing half, specifically for the duration of the necessary machining, and by means of which the at least one machining tool can be positioned in the proximity of the rotor or immediately next to the rotor so that it can be brought into engagement with the rotor for the machining. The at least one tool is arranged on a tool holder which is movably mounted on the basic body. Therefore, for a machining process the tool can comfortably be moved and accurately positioned at one or more desired machining position(s). Provision is made for example for linear guides by means of which a preferably motorized movement of the tool holder and therefore of the at least one tool is possible. The tool holder can for example also be arranged on a tool carrier which can be provided especially in the form of a carriage which is movable along at least two axes.

Serving as the basic body can for example be a carrier plate of which one end region is preferably fastened on the lower housing half in the region of the parting joint, especially fastened by screws on the housing half, and of which the end region which lies opposite the fastened end region projects into the housing half in the direction of the rotor and carries the tool.

In a preferred embodiment, the basic body can be distinguished by a Z-shape with two plate-like sections which are orientated at least in the main parallel to each other, are arranged in an offset manner to each other, and are interconnected via an also plate-like connecting section which is preferably oriented at least in the main orthogonally to the two plate-like sections. Provision is then preferably made on the upper side and/or lower side for reinforcing members in order to increase the rigidity and stability of the basic body. Via a basic body which is Z-shaped in cross section, such as a carrier plate which is Z-shaped in cross section, the height of tool holders and/or tool carriers which are possibly provided and/or linear guides which are possibly provided and further components which are possibly provided can be balanced so that the at least one machining tool can be brought into engagement with the rotor at least approximately in the middle.

The dimensions of the basic body are preferably adapted to the turbine type or to the turbine types on which the device according to the embodiments of the invention is to be used. The length lies for example within the range of between 140 cm and 150 cm and the width lies within the range of between 40 cm and 50 cm so that in the case of current turbine types on the one hand as a result of the length especially the distance between the wall of the lower housing half of the turbine and the rotor can be bridged by the basic body, and on the other hand the width ensures that sufficient travel distance is provided on the basic body for the at least one machining tool in order to bridge for example the distance between two adjacent wheel disks so that machining positions on two wheel disks can be reached without the device according to the embodiments of the invention having to be detached from the lower housing half and having to be fixed again on this at another axial position.

The at least one machining tool can for example be arranged on the upper side of a basic body which is provided for example by a carrier plate, as a result of which a particularly high degree of accessibility of the machining tool is ensured.

In the case of the fastening means which are provided on the basic body they can be through-holes through which screws and/or threaded rods can be guided for the fastening of the basic body and screwed into threaded holes provided on the turbine housing or guided through through-holes provided on the turbine housing and fastened by means of nuts. In a preferred embodiment, the fastening means are designed in such a way that fastening on the housings of turbines of different constructional types is conveniently possible. For example, a plurality of through-holes can be provided on the basic body at different positions in order to ensure a high degree of installation flexibility-even for different turbine types—and in order to be able to bridge different distances between housing wall and rotor.

Provision can be made for a tool carrier which is directly or indirectly fastened on the basic body and which can be aligned-for example via linear guides-preferably along at least two axes relative to the basic body, and on which the tool holder and therefore the at least one tool are then arranged.

In the case of the at least one machining tool which is arranged on the tool holder, it can be for example a turning tool, such as an end-cut turning tool. Machining by means of the device according to the embodiments of the invention by turning is particularly advantageous since the relative movement between tool and workpiece, that is to say the rotor or component of this which is to be machined, can then especially be achieved by the rotating device of the rotor which is available anyway so that an additional working spindle is not required. Alternatively or in addition to the available rotating device of the rotor being used, a separate rotating device can also be provided and used, for example if turning speeds which cannot be realized, or not easily realized, using the available turning device are desired or necessary.

For a particularly high degree of rigidity of the device in the installed state and therefore a particularly stable positioning of the basic body and machining tool mounted thereon, which results in high machining accuracy, the device according to the embodiments of the invention furthermore comprises a plurality of preferably rod-like stabilizing elements which in particular are produced from metal. At their one end these are connected in an articulated manner to the basic body and the respectively other ends—similar to the basic body-can be fixed on the lower housing half of the turbine or are fixed in the installed state, for which suitable additional fastening means are provided for an also articulated connection. The stabilizing elements, of which for example two or three or even more can be provided, are telescopic, that is to say can be altered in their length. They can also preferably be steplessly locked in different length adjustment, as a result of which it is possible, after their fastening on a turbine housing half, to maintain an adjustment which stabilizes the basic body as a consequence of a selected length and locking, especially to apply compression stresses for the stabilizing. By means of the stabilizing elements an adjustment of the at least one machining tool on a turning center can also be achieved, wherein as a result of which inter alia the possibly occurring deflection of the basic body on account of the natural weight of the device can be compensated for.

The stabilizing elements can for example comprise in each case two struts and a clamping device via which the two struts are interconnected. The clamping device is then preferably designed in such a way that the length of the stabilizing elements can be steplessly altered and locked. For example, the arrangement is such that by operating the clamping device the two struts can be moved toward each other or away from each other.

For the machining of a rotor, the machining device according to the embodiments of the invention can be mounted in a simple, convenient manner on a turbine housing by the basic body and the stabilizing elements being mounted on the housing, for example fastened by screws and/or clamped. The articulated connections according to the embodiments of the invention in this case enable a particularly high degree of installation flexibility and the device can be aligned in an ideal manner. As a consequence of the high degree of rigidity of the device caused in particular by the stabilizing elements, a particularly high degree of machining accuracy is achieved in the installed state.

One embodiment of the device according to the embodiments of the invention is distinguished by the fact that the stabilizing elements are fastened in an articulated manner on one end region of the basic body and the fastening means for the releasable fastening of the basic body on the lower housing half in the region of the parting joint are provided on an end region of the basic body which lies opposite this end region. One end region of the basic body can then be fastened, for example fastened by screws, directly on the housing, and the end region which lies opposite this and in the installed state projects into the housing interior and faces the rotor, can be connected via the stabilizing elements to the housing and thereby be stabilized. In an advantageous embodiment the at least one machining tool is then also arranged in that end region of the basic body on which the stabilizing elements are connected to this. For example, the at least one machining tool is arranged on the upper side of that end region which lies opposite the end region provided with the fastening means and in the installed state of the device faces the rotor, and the stabilizing elements are fastened on the underside and/or on the sides of the basic body in this end region.

A further embodiment is distinguished by the fact that three stabilizing elements are provided and in particular one free end of one stabilizing element is fastened in an articulated manner on the underside of the basic body and of the two other stabilizing elements one free end of each is fastened in an articulated manner on the basic body on the side with regard to the underside, wherein the free ends of the two other stabilizing elements are fastened especially on oppositely disposed sides of the basic body. If the arrangement is found in such a way, the stabilizing elements can be fixed on the lower housing half of the turbine by means of the additional fastening means especially in such a way that in the installed state of the device a tetrahedron, that is to say a particularly stable geometric shape, is at least approximately spanned by the stabilizing elements. The two stabilizing elements which are fastened on the basic body on the side are then preferably—similarly to the basic body— releasably fastened on the housing in the region of the parting joint, for which recourse may be made to threaded holes and/or through-holes which are provided anyway in the housing in the region of the parting joint and that stabilizing element which is fastened on the underside of the basic body is releasably fastened by clamping particularly on the housing inner side, preferably on mountings for stator blade carriers which are provided there.

It can also be provided that the additional fastening means of that stabilizing element the free end of which is fastened in an articulated manner on the underside of the basic body are designed so as to enable a releasable fastening on the lower housing halves by clamping, and/or the additional fastening means of those stabilizing elements the free ends of which in each case are fastened in an articulated manner on the basic body on the side are designed so as to enable a releasable fastening on the lower housing half in the region of the parting joint by screw fastening.

The device can furthermore comprise a laser measuring device which is directly or indirectly fastened and/or formed on the basic body and can especially be aligned, preferably along at least two axes, relative to the basic body, in order to scan and especially to measure a region, preferably a groove, which is to be machined on the rotor. By means of the laser measuring device, a live measurement can still be carried out during the machining. The laser measuring device is preferably designed in such a way that it works based on the measuring principle of laser linear triangulation. If provision is made for a tool carrier which-for example by means of linear guides-is movably arranged on the basic body, and carries the at least one machining tool, the laser measuring device can also be fastened on the tool carrier so that together with the machining tool it is moved onto a position which is to be machined in each case.

For collecting the material chips which arise as a result of machining the rotor, the device can also comprise a collecting and/or transporting device, especially a suction device, which preferably comprises at least one collecting container for material chips and/or a vacuum cleaner, especially preferably an industrial vacuum cleaner. The collecting container preferably comprises an inlet opening, provided for example on its upper side, for material chips, wherein the arrangement is then designed in such a way that the inlet opening lies beneath the at least one machining tool so that the resulting material chips fall into the inlet opening. Preferably, the cutting edge of the at least one machining tool, especially of the blade of an end-cut turning tool which is being used, points downward so that the resulting material chips are directed directly into the inlet opening as a result of the rake angle of the cutting edge. If a movable tool holder is provided, the collecting container can also be fastened on this. An inlet opening which is preferably provided on this is then always automatically moved-together with the tool-to the place where the material chips emerge.

A further subject matter of the embodiments of the invention is a method for machining a rotor arranged in a turbine housing which consists of two parts, thereby forming a parting joint, in which the upper housing half is detached from the lower housing half,
if applicable, rotor blades and/or stator blades are removed,
a machining device, which has at least one machining tool, is releasably fastened on the lower housing half,
by means of the at least one machining tool material is removed from the rotor, especially by the at least one machining tool being brought into engagement with a region of the rotor which is to be machined and by the rotor being turned while the machining tool is engaged with this in the region which is to be machined,
after completion of the machining process, which can be carried out at one or more machining positions on the rotor, the machining device is released again from the lower housing half,
if applicable, rotor blades and/or stator blades are re-installed, and
the upper housing half is re-connected to the lower housing half.

In a preferred embodiment of the method, a machining device is releasably fastened on the lower half of the turbine housing, wherein the basic body is especially releasably fastened via the corresponding fastening means on the lower housing half in the region of the parting joint, and the stabilizing elements, one free end of which is fastened in an articulated manner on the basic body, are releasably fastened, especially screwed and/or clamped, by their respectively other free end in the region of the parting joint and/or on the housing inner side, preferably on mountings for stator blade carriers which are provided there.

It can furthermore be provided that the stabilizing elements, and in particular the basic body, are releasably fastened on the lower housing half in such a way that in the installed state a tetrahedron is at least approximately spanned by the stabilizing elements, especially together with the basic body, wherein use is preferably made of a machining device which comprises three stabilizing elements. A tetrahedron is a particularly stable geometric shape so that a particularly high degree of stability of the device can be achieved in the state mounted on the turbine housing.

For obtaining the shape of a tetrahedron in the case of a device with three stabilizing elements, the fastening on the lower housing half is preferably carried out in such a way that two of the stabilizing elements are at least approximately horizontally aligned in the installed state and one of the stabilizing elements is at least approximately vertically aligned in the installed state, wherein to be understood by at least approximately horizontally or vertically is that an angle of between 0° and 25° is included with the horizontal or vertical. The fastening is preferably carried out in such a way that an angle of between 5° and 25° is included with the horizontal or the vertical. In this case, one stabilizing element which is fastened on the underside of the basic body is preferably oriented at least approximately vertically and stabilizing elements which are fastened on the sides, especially on opposite sides, of the basic body are oriented at least approximately horizontally.

By means of the at least one machining tool, in an especially preferred embodiment a groove existing on the rotor is machined, preferably cut deeper, especially by at least 0.8 mm, preferably by at least 1.0 mm, especially preferably by about 1.5 mm.

In the case of the at least one groove, it is preferably an annular groove which serves for the fastening of sealing plates which in particular extend along the outer circumference of a wheel disk or of a mini-disk of the rotor.

In conclusion, the subject matter of the embodiments of the invention is a method for repairing and/or retrofitting a turbine in which in an annular groove, which is provided on the rotor of the turbine and serves for the fastening of sealing plates and preferably extends along the outer circumference of a wheel disk or an intermediate disk of the rotor, an elongate sealing strip, especially produced from metal, is arranged with sealing plates removed from the annular groove, the width of the sealing strip preferably being adapted to the width of the annular groove and the thickness of the sealing strip preferably being within the range of between 0.5 mm and 5 mm, especially preferably within the range of between 1 mm and 2 mm, and the length of the sealing strip preferably corresponding to the circumference of the annular groove in the region of the groove bottom or exceeding this.

The method according to the embodiments of the invention for repairing and/or retrofitting a turbine is especially carried out following the method according to the embodiments of the invention for machining a rotor arranged in a turbine housing which consists of two parts, thereby forming a parting joint, especially preferably after an annular groove, which serves for the fastening of sealing plates, has been cut deeper while carrying this out. In a development of the method according to the embodiments of the invention for repairing and/or retrofitting a turbine, it is provided that the sealing strip is arranged in the annular groove in such a way that it is oriented at least in the main orthogonally to the two faces of the annular groove.

It has been shown that a very reliable way of avoiding cooling air leakages on a turbine in the region of the sealing plates, which are inserted in annular grooves provided on the rotor for fastening, involves arranging a sealing strip, preferably produced from metal, in the annular grooves in each case beneath the sealing plates, which sealing strip especially extends in the annular groove in a circumferential manner, around the entire circumference in a particularly expedient embodiment, and which is preferably oriented transversely to the sealing plates. The width of such a sealing strip expediently corresponds to the width of the annular groove which is to be sealed and/or the length of the sealing strip corresponds to the circumference of the annular groove in the region of the annular groove bottom or in the radial direction just above, for example a few millimeters above, the groove bottom.

The sealing strip threaded into the groove, lying "loosely" in the groove bottom, is then pushed radially outward and therefore against the lower end faces of the sealing plates with sealing effect during operation of the gas turbine on account of the centrifugal force which occurs during rotation of the rotor since the sealing strip butts from the bottom against the faces of the annular groove in a form-fitting manner perpendicularly to the sealing plates so that cooling air leakages and therefore accompanying reductions in efficiency and power of the turbine are reliably avoided or at least appreciably reduced. As a consequence of avoiding cooling air leakages, better cooling of the blade roots is also possible, as a result of which a longer service life of these can be achieved.

BRIEF DESCRIPTION

Some of the embodiments will be described in detail, with reference to the following figures, wherein like designations denote like members, wherein.

DETAILED DESCRIPTION

Figure 1:
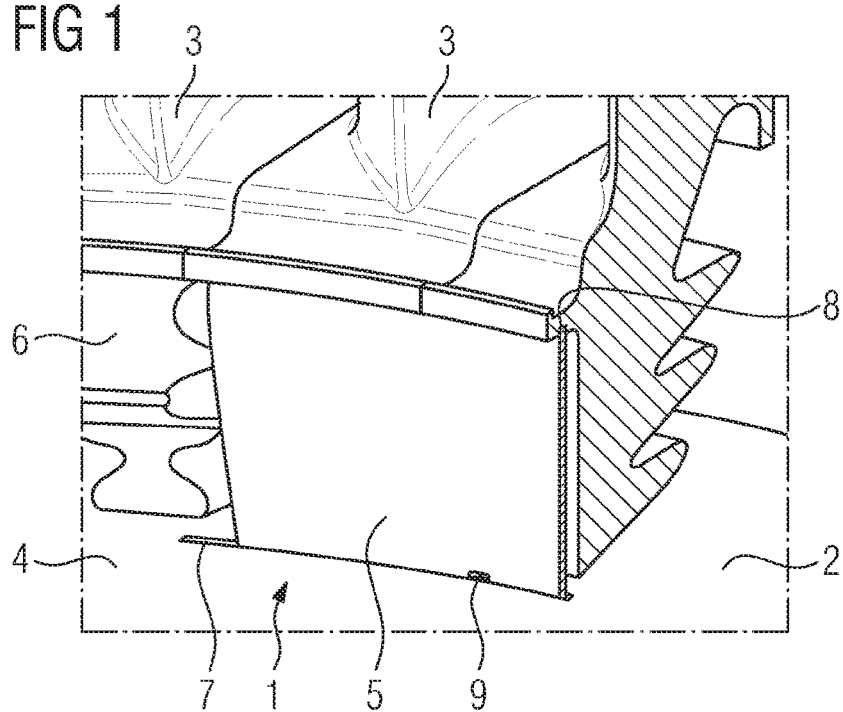
FIG. 1 shows a perspective partial view of a wheel disk arrangement of the rotor of a gas turbine with rotor blades and a sealing plate.

FIG. 1 shows a perspective partial view of a wheel disk arrangement 1 of the rotor of a gas turbine which is not additionally shown. The wheel disk arrangement 1 comprises a wheel disk 2, a plurality of rotor blades 3 which are fastened along the outer circumference of the wheel disk 2, an intermediate disk, also referred to as a mini-disk 4, and a plurality of sealing plates 5, of which only one is inserted in the state shown in FIG. 1. The rotor blades 3 have fir-tree-shaped roots 6 which are inserted for fastening in correspondingly designed locating grooves in the wheel disk 2. The mini-disk 4 has a smaller diameter than the wheel disk 2 and is arranged in front of the wheel disk 2 in FIG. 1. The rotor comprises in a known manner per se a multiplicity of wheel disk arrangements 1 which are arranged one behind the other in the axial direction, wherein a mini-disk 4 and a wheel disk 2 alternate in each case.

The sealing plates 5 are retained in two radially spaced apart annular grooves 7, 8, specifically a lower annular groove 7, which is provided in the mini-disk 4, and an upper annular groove 8 which is defined by a large number of adjacently arranged segments which are provided in each case in the individual rotor blades 3.

Figure 2:
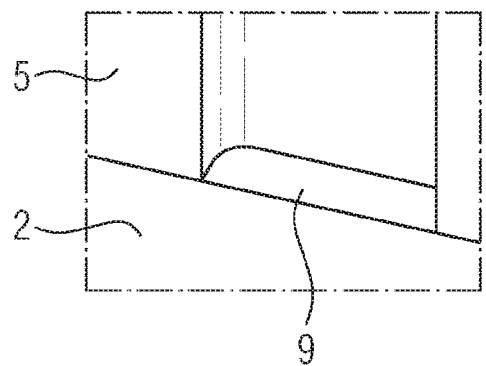
FIG. 2 shows an enlarged detail from FIG. 1, which shows a section of the sealing plate in the region of the cooling air leakage.

Similarly provided on the rear side of the wheel disk 2, not visible in FIG. 1, are sealing plates 5 of the wheel disk arrangement 1 which are also retained in two annular grooves 7, 8. In this case, the upper annular groove 8 is again defined by a large number of adjacently arranged segments which are provided in each case in the individual rotor blades 3. The lower annular groove 7, however, is not provided on the rear side in a mini-disk 4 but in the wheel disk 2. On account of the gaps 9 between the sealing plates 5 and the wheel disks 2 or mini-disks 4 of the rotor, which occur in particular in the region of the annular groove 7 provided in the wheel disk 2 or the mini-disk 2b and in which are retained the sealing plates 5 on the wheel disk side or mini-disk side, cooling air leakages occur during operation of the gas turbine. Such a gap 9 can be gathered by way of example from enlarged view from FIG. 2.

Such cooling air leakages occur in particular in the overlapping region of adjacent sealing plates 5, where gap formation increasingly occurs. In the present case, the gaps which exist on account of the overlaps are approximately 0.08 mm wide. The leakages cause a reduction of the efficiency and of the generated power of the gas turbine.

This problem is met according to the embodiments of the invention—with rotor blades 3 removed—by a sealing strip 10, produced from metal, of suitable dimension being threaded in an encompassing manner into the annular grooves 7 in the wheel disk 2 or mini-disk 4. The sealing strip 10 in the state inserted into the annular groove 7 can be gathered from the schematic sectional view from FIG. 3.

The dimensions of the sealing strip 10 are in this case to be selected in such a way that during operation it seals from the bottom over the entire circumference of the annular groove 7 perpendicularly to the sealing plates 5, that is to say in the axial direction and in the circumferential direction lies in the annular groove 7 in an at least approximately form fitting manner. Accordingly, the width of the sealing strip 10 should correspond to the width of the annular groove 7 which is to be sealed so that the sealing strip 10, when it is inserted into this orthogonally to the faces of the annular groove 7, butts against the faces in a form fitting manner, and the length of the sealing strip 10 should correspond to the circumference of the annular groove 7 in the region of the annular groove bottom, or just above this, for example 1 mm, in the radial direction.

During operation of the gas turbine, when the rotor blades 3 and sealing plates 5 are installed, the inserted sealing strip 10, which extends in the annular groove 7 beneath the sealing plates 5 over the entire circumference of the annular groove 7, on account of the centrifugal forces which occur during rotation of the rotor is pressed against and seals the lower faces of the sealing plates 5 on account of its form fitting seating from the bottom so that cooling air leakages are avoided or at least appreciably reduced.

Before the sealing strip 10 can be threaded into the annular groove 7 in the wheel disk 2 or mini-disk 4, the annular groove 7 is expediently cut deeper compared with its original production state so that there is sufficient room for the sealing strip 10.

For a mechanical aftermachining of the rotor, however, according to the prior art the rotor has to be completely removed from the gas turbine and de-stacked, as a result of which a considerable expenditure of time and manpower and therefore considerable costs would be created.

By implementing the method according to the embodiments of the invention for machining a rotor and by using a machining device according to the embodiments of the invention this can be avoided since by means of this an aftermachining of the rotor in the installed, stacked state in situ is possible.

Starting from a completely installed state of the gas turbine, which includes the rotor which is provided with the annular grooves 7, 8 for location of the sealing plates 5 and is arranged in a turbine housing which consists of two parts, thereby forming a parting joint 11, for implementing the method according to the embodiments of the invention for machining a rotor the upper housing half is first of all detached from the lower housing half 12 and the rotor blades 3 and the stator blades are removed, the entire guide vane assembly especially being disconnected. A gas turbine in the partially dismantled state resulting from this can be gathered from FIGS. 4 to 6 in different views. Of the rotor, only the wheel disks 2 and mini-disks 4 are shown in these. The wheel disks 2 and mini-disks 4 are fastened in a known manner per se on a shaft, not evident in the Figures, of the rotor and via this can be made to rotate. The gas turbine is brought into such a partially dismantled state for example in the course of a HGPI (hot gas path inspection).

After removing the upper housing half and blades, in the next step a machining device 13 according to the embodiments of the invention is releasably fastened on the lower housing half 12. One embodiment of a machining device 13 according to the embodiments of the invention can be gathered from FIGS. 4 to 6 in different views, in actual fact in the state installed on the lower housing half 12.

The machining device 13 has a basic body 14, a tool holder 15 which is mounted on the upper side of the basic body 14 and movable relative to this, and three telescopically designed rod-like stabilizing elements 16.

Figure 3:
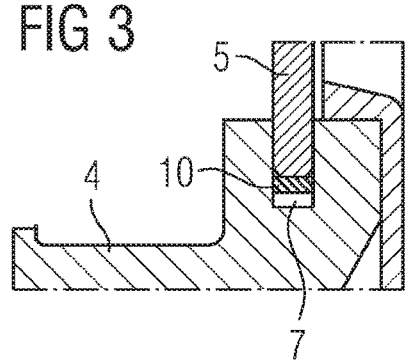
FIG. 3 shows a partial section, in a schematic view, through the annular groove of a wheel disk, in which a sealing plate is retained and an encompassing sealing strip is arranged.
Figure 10:
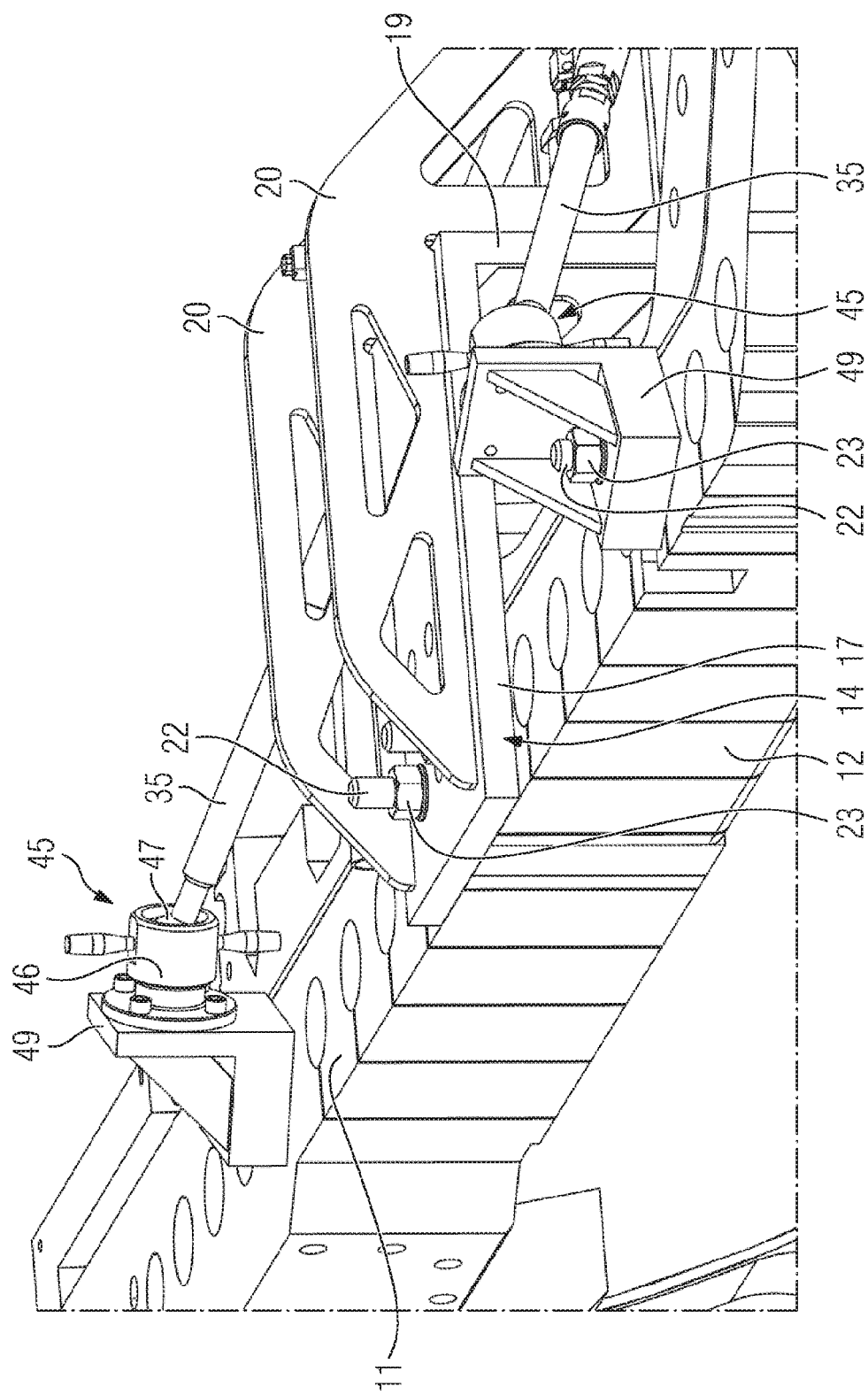
FIG. 10 shows a perspective partial view of the device from FIG. 4, which shows the basic body and two of the stabilizing elements in specific sections in an enlarged view.

The basic body 14 is provided in the present case by a carrier plate which in cross section is approximately of Z-shaped design and has an upper and a lower plate-like section 17, 18 which are oriented at least in the main parallel to each other, in FIG. 3 extend horizontally and are in an offset arrangement with each other in the vertical direction. The two horizontal plate-like sections 17, 18 are interconnected via a vertically extending connecting section 19, as a result of which the Z-shape is produced. For achieving a particularly high degree of stability of the basic body 14 in the installed state, reinforcing members 20 are also provided on the plate-like sections 17, 18 both on the upper side and the lower side (cf. also FIG. 10). The length of the basic body 14 in the case of the depicted exemplary embodiment is 140 cm and the width is 40 cm.

The Z-shaped basic body 14 in the depicted installed state is releasably fastened on the lower housing half 12 in the region of the parting joint 11 of the housing. For this purpose, the basic body has fastening means 21 on its end region which in the installed state faces away from the rotor and faces the lower housing half 12, which fastening means in the depicted exemplary embodiment are provided by altogether six through-holes 21 which can be easily gathered from the plan view from FIG. 6. The six through-holes 21 are split into two rows with three holes 21 lying next to each in each case, wherein one row with three through-holes lies further inward, that is to say closer to the end region of the basic body 14 which faces the rotor and on which the tool holder 15 is arranged on this. This row of through-holes 21 is not used in the depicted exemplary embodiment but serves for the fastening of the basic body 14 on the lower housing half 12 of another turbine in which the distance between the housing wall and the rotor is smaller than in the case of the depicted exemplary embodiment, in fact at least approximately by the spacing of the two rows of through-holes 21. The device 13 according to the embodiments of the invention can therefore be used in a particularly flexible manner on turbines of different design.

For the releasable fastening of the basic body 14, a threaded rod 22 extends through two of the six through-holes 21 in each case. The threaded rod 22 furthermore extends through a through-hole 21, which is not visible in the Figures, in the lower housing half 12. A washer is fitted and a nut 23 screwed onto both ends in each case in order to clamp the basic body 14 against the lower housing half 12 (cf also the enlarged view from FIG. 10). The through-holes 21 in the lower housing half 12 are ones which exist anyway in the lower housing half 12 in the region of the parting joint 11 in order to create the connection between the lower 12 and the upper housing halves.

Figure 8:
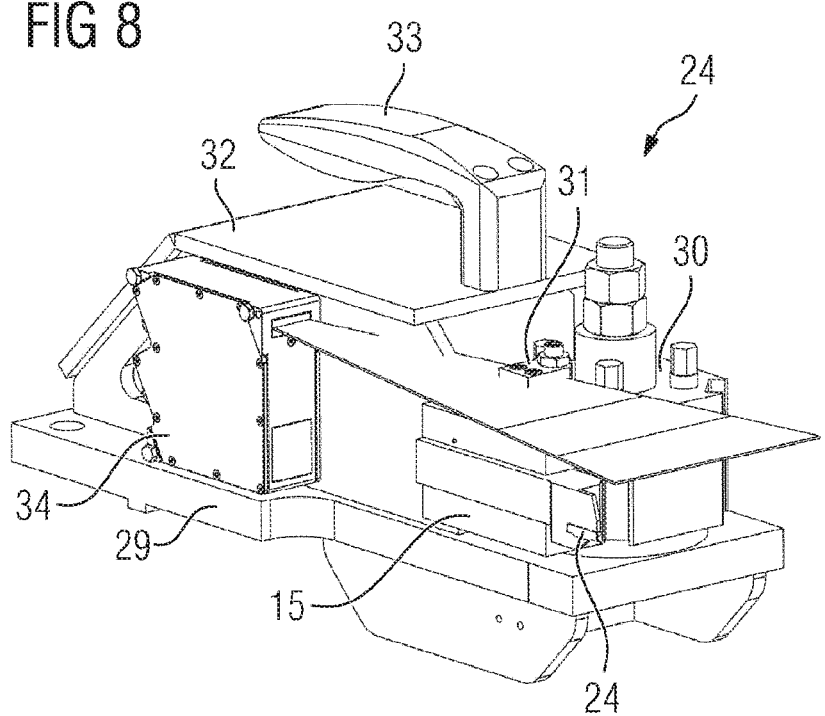
FIG. 8 shows a perspective view, obliquely from the top, of the tool carrier of the device from FIG. 4 with tool holder fastened thereon.
Figure 9:
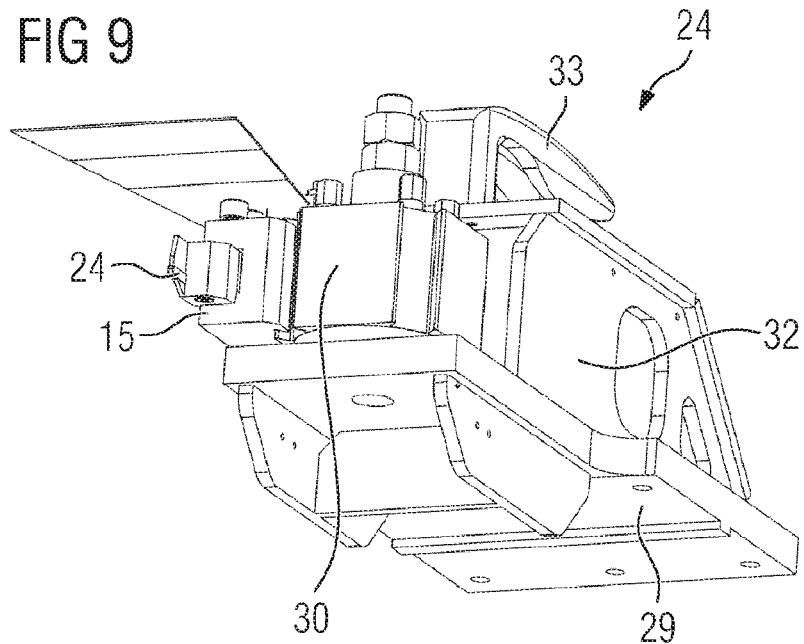
FIG. 9 shows a perspective view, obliquely from the bottom, of the tool carrier from FIG. 8.

Movably retained on the basic body 14 of the device according to the embodiments of the invention is the tool holder 15 which in the present case-as can be seen in FIGS. 8 and 9-carries an end-cut turning tool 24 as the machining tool. Specifically, the tool holder 15 is releasably fastened on a tool carrier 25 which can be aligned relative to the basic body 14, wherein the tool carrier 25 is arranged on the upper side of the basic body 14. Enlarged views of the tool carrier 25 with tool holder 15 mounted thereon can be gathered from FIGS. 8 and 9. The end-cut turning tool 24 is screwed to the tool holder 15 so that it can detached from said tool holder 15.

Figure 7:
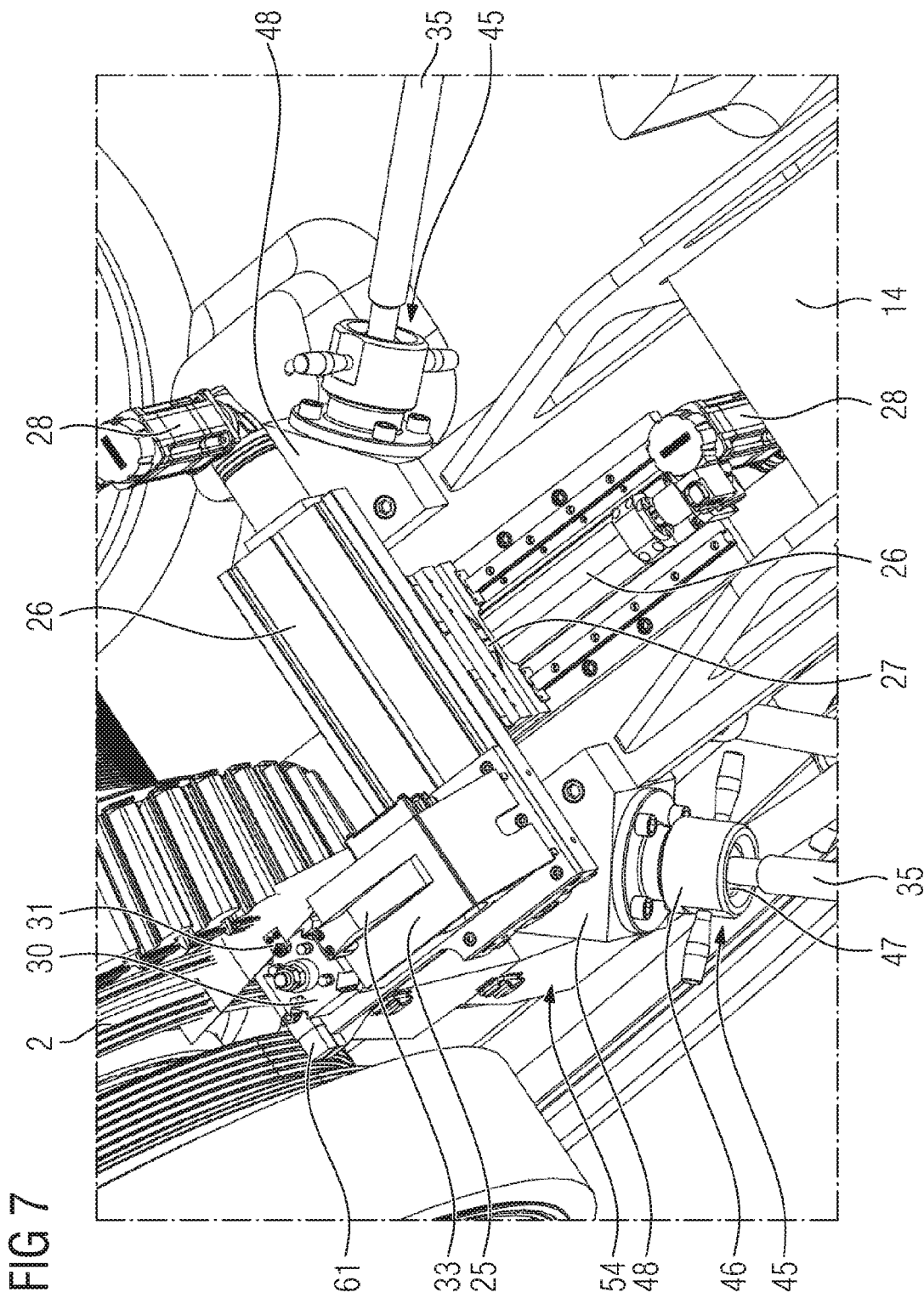
FIG. 7 shows a perspective partial view, obliquely from the top, of the device from FIG. 4.

The tool carrier 25, by means of two linear guides 26 which are oriented horizontally and orthogonally to each other, can be moved linearly along two axes which are orthogonal to each other, and by means of a clamping ring 27 which interconnects the two linear guides 26 is rotatably fastened on the basic body 14. With this, an angle between the axes can be adjusted if required. The clamping ring 27 is to be seen in the enlarged view according to FIG. 7. The tool carrier 25, as can be gathered from FIG. 7, is screwed to the guide carriage of the upper linear guide 26 and the upper linear guide 26 is screwed to the guide carriage of the lower linear guide 26.

Figure 4:
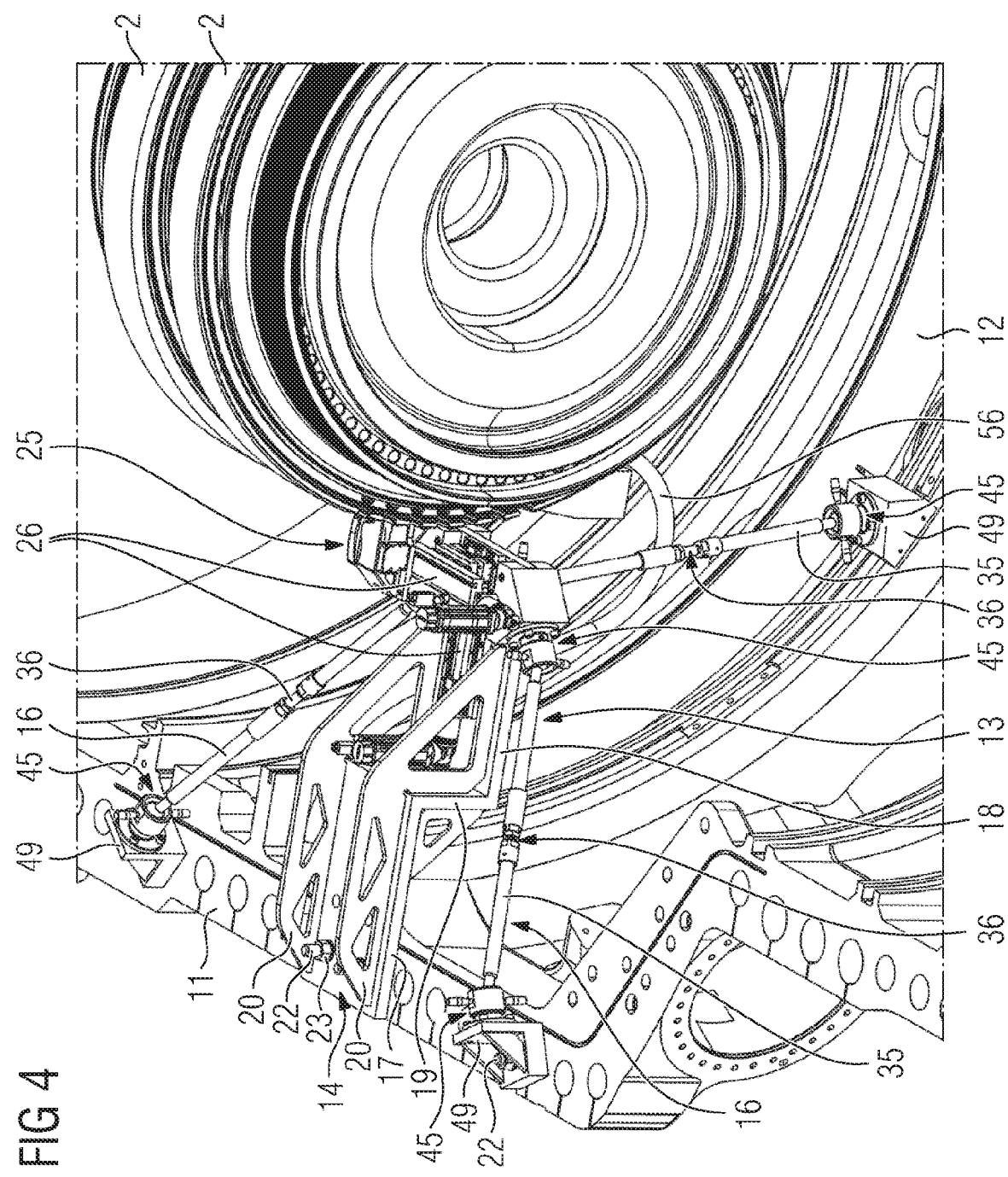
FIG. 4 shows a perspective view, obliquely from the top, of an embodiment of the machining device in the installed state.
Figure 5:
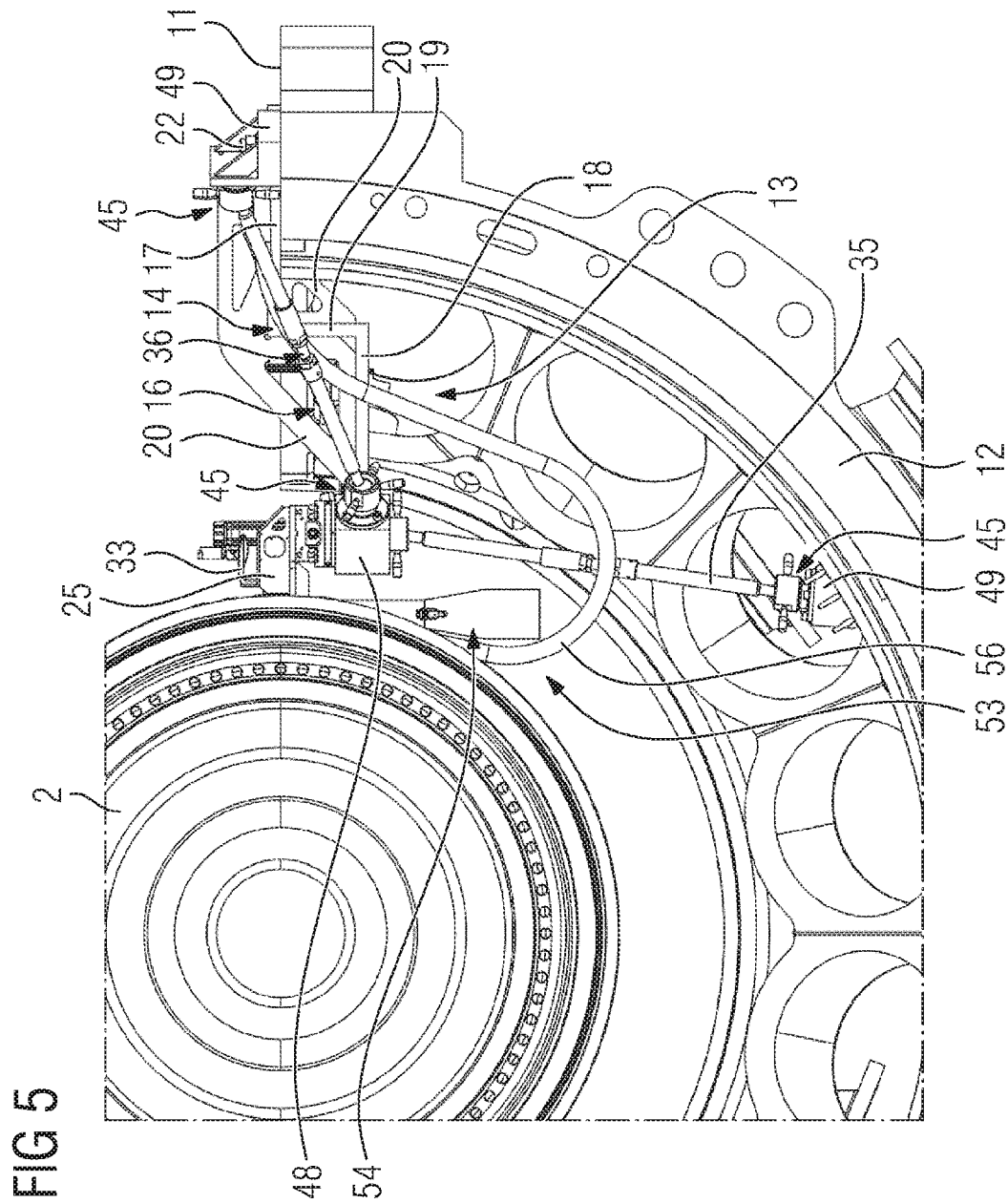
FIG. 5 shows a perspective side view of the device from FIG. 4.
Figure 6:
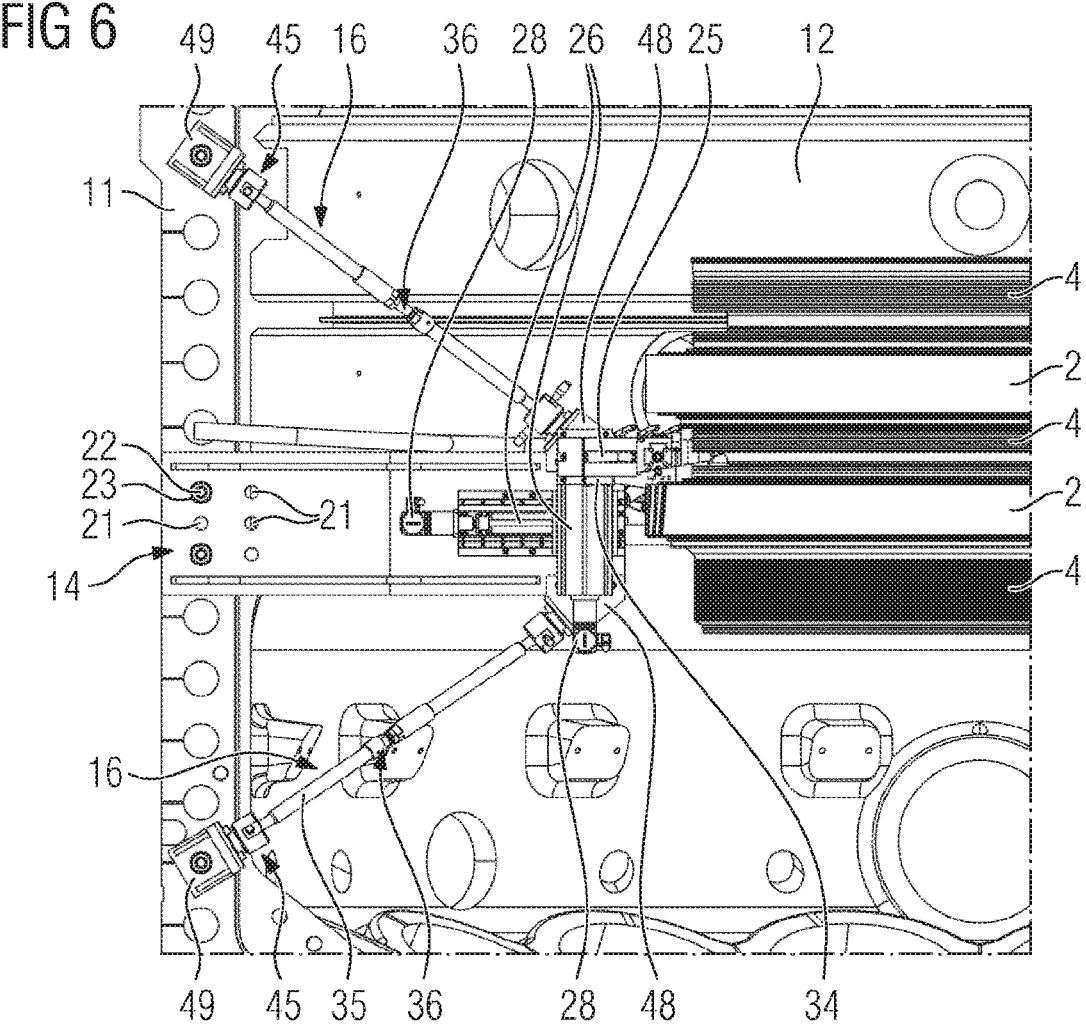
FIG. 6 shows a perspective plan view of the device from FIG. 4.

As emerges from FIGS. 4 to 6, the linear guides 26 are specifically oriented in such a way that in the installed state of the machining device 13 both a movement of the tool carrier 25 in the radial direction and in the axial direction with regard to the rotor is possible. Associated with each of the two linear guides 26 is a motor 28 via which the tool carrier 25 can be moved back and forth in a motorized manner along the respective axis. The motors 28 are connected to a control device, not shown in the Figures, via which a CNC-based control of the position of the tool carrier 25 and therefore of the tool holder 15 is possible. The control device is designed in such a way that a compensating control is possible and the reversal backlash when the direction of travel is changed is taken into consideration in order to enable a particularly precise positioning.

An enlarged view of the tool carrier 25 with tool holder 15 can be gathered from FIGS. 8 and 9. Specifically, the tool carrier 25 comprises a baseplate 29 on the upper side of which, on the side pointing toward the right in FIGS. 4, 6 and 8 which is to face the rotor in the installed state, a tool mounting 30 is arranged and screwed to the baseplate 29. Mounted on the tool mounting 30 is in turn the tool holder 15 with the end-cut turning tool 24 in such a way that the cutting edge of the end-cut turning tool 23 points downward. The tool holder 15 and the tool mounting 30 are designed in this case to correspond to each other in such a way that the tool holder 15, at two predetermined positions which are located on opposite sides of the tool mounting 30, can be fitted in a form fitting manner from the top onto the tool mounting 30. As a result of the two fitting positions and a correspondingly long travel distance of the linear guide 26 with regard to the rotor in the axial direction, it becomes possible to machine altogether four annular grooves 7 on two wheel disks 2 or mini-disks 4 without a re-positioning of the entire machining device 13 on the lower housing half 12 being necessary.

In order to prevent the tool holder 15 being able to leave one of the two predetermined positions on the tool mounting 30 in the upward direction during operation, provision is made for eccentric elements, which are not visible in the Figures. In order to be able to alter the height of the tool holder 15, a height adjustment device 31 is provided.

Figure 12:
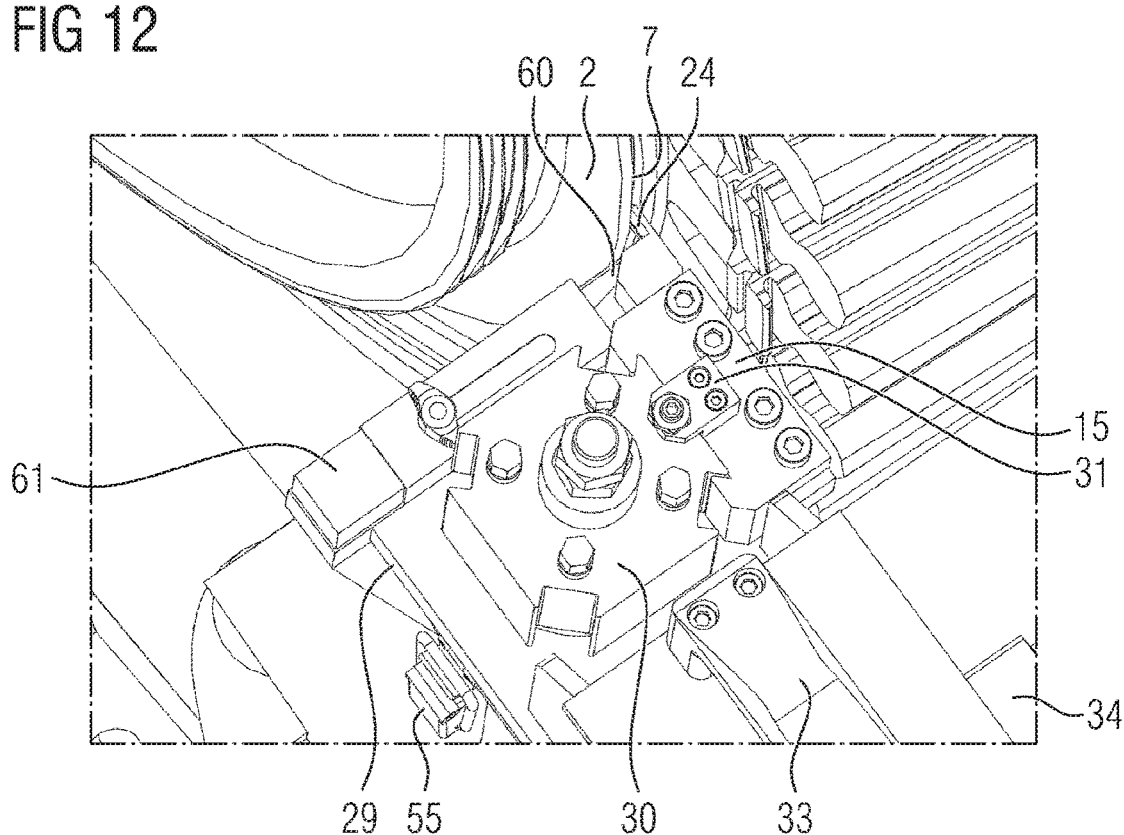
FIG. 12 shows a perspective partial view of the device from FIG. 4, which shows the tool mounting with tool holder fastened thereon obliquely from the top in an enlarged view.

The tool mounting 30 and the tool holder 15 can also be easily gathered from the enlarged plan view from FIG. 12. The tool carrier 25 also has a housing element 32, also arranged on the baseplate 29, on the upper side of which provision is made for a handle 33 for the easy installing, removing and relocating of the tool carrier 25.

Arranged on the housing element 32 on the side is a laser measuring device 34 which is designed so as to scan and to measure a region to be machined which in the depicted exemplary embodiment is the encompassing annular groove 7 in the wheel disks 2 or mini-disks 4 of the rotor of the gas turbine. The laser measuring device 34 is designed so as to operate based on the principle of laser linear triangulation and to carry out two-dimensional measuring. The laser signal which is emitted for the scanning process is indicated purely schematically in FIGS. 8 and 9. The laser measuring device 34 can have a terminal via which it can be connected to the CNC-based control device in order to transmit recorded values to this in the course of a scanning or measuring process, which values are then used for controlling the linear guides 26 for aligning the end-cut turning tool 24 relative to the region on the wheel disk 2 which is to be machined.

In order to achieve a particularly high degree of stability and therefore particularly high machining accuracy, the basic body 14, in addition to the fastening by the threaded rods 22 in the region of the parting joint 11, is releasably fastened on the lower housing half 12 by means of the three stabilizing elements 16.

The stabilizing elements 16, produced from metal, are of rod-like design and telescopic, that is to say variable in their length, and can be locked in a stepless manner in different length adjustments. In the depicted exemplary embodiment, the stabilizing elements 16 are specifically designed as clamping struts which in each case comprise two struts 35 and a clamping device 36. The two struts 35 are interconnected in this case via the clamping device 36 which is arranged at approximately mid-height of the stabilizing elements 16. The two struts 35 and the clamping device 36 can be gathered from the enlarged view from FIG. 13.

Via the clamping devices 36, the length of the stabilizing elements 16 can be altered and locked in a stepless manner. For this purpose, each clamping device 36 comprises a first sleeve 37 which is fitted over the end of one of the two struts 35, specifically that pointing to the left in FIG. 13, and which is fastened on the left-hand strut 35 in such a way that it can be rotated in relation to this but its axial position on this cannot be altered. To this end, provision is made on the end of the left-hand strut 35 for an encompassing groove 38, and threaded holes extend through the wall of the sleeve 37 and into which screws 39 are screwed in such a way that they project right into the groove 38, but are not in contact with the strut 35. Provision is made on the sleeve 37 on the outside for flattened locating surfaces 40 for location of a spanner for the easy rotation of the first sleeve 37 by a user.

Figure 13:
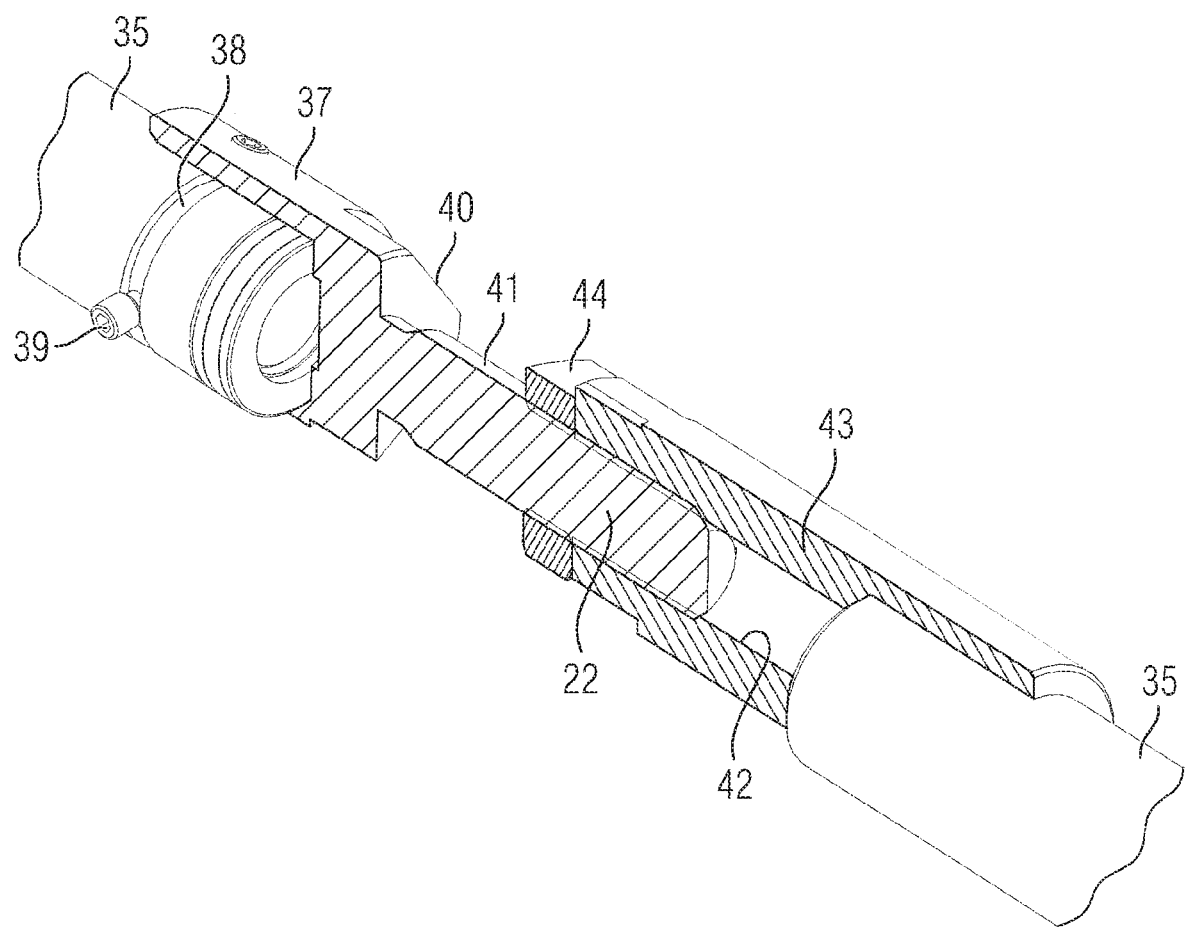
FIG. 13 shows an enlarged perspective view of a clamping device of a stabilizing element of the device from FIG. 4.

Projecting from the free end of the sleeve 37, which points to the right in FIG. 13, is a threaded rod 22, provided with a male thread 41, which extends in the axial direction of the stabilizing element 16. In the case of the male thread 41 it is a fine thread. The threaded rod 22 is designed in one piece with the sleeve 37 in the depicted exemplary embodiment but can also constitute a separate component which is then rigidly connected to the sleeve 37 in order to be able to be rotated together with this.

Screwed onto the threaded rod 22 is a second sleeve 43, provided with a female thread 42, of the clamping device 36 which is rigidly fastened on the end of the other strut 35, specifically fitted on its end and welded to this. In the case of the female thread 42 of the second sleeve 43 it is a fine thread corresponding to the male thread 41.

As a consequence of the previously described arrangement, it is possible that the first sleeve 37 can be rotated relative to the second sleeve 43 and as a result of this the relative axial position of the two sleeves 37, 43 and therefore of the two struts 35 in relation to each other can be altered. Since the length is variable, with the ends of the stabilizing elements 16 fixed, a compression stress can be introduced into the stabilizing elements 16 as a result of a length increase, as a result of which a particularly high degree of stability is achieved.

So that a once adjusted length is not undesirably made smaller again and the compression stresses reduced, provision is made for a locknut 44 which after the adjustment to a desired length by rotating the first sleeve 37 by a user is screwed against the second sleeve 43.

In the perspective FIG. 13, the two sleeves 37 and 43 and also the locknut 44 are shown in section for clarification.

Of each of the three stabilizing elements 16, which in each case include a clamping device 36, one free end is fastened in an articulated manner on the basic body 14 and the other free end is fastened in an articulated and releasable manner on the lower housing half 12. Specifically, one free end is fastened in each case on that end region of the basic body 14, which in the installed state according to FIGS. 4 to 6 faces the rotor, via a ball joint 45 in each case which can be locked via screws with fine threads.

Each ball joint 45 comprises a joint ball socket 46 which is screw-fastened on the rotor-side end region of the basic body 14 and also a joint ball 47 which is provided on the respective free end of the stabilizing element 16, which joint ball is seated in the joint ball socket 46, can be rotated within this and can be locked via screws. Of the three joint ball sockets 46, as can especially be seen in the side view from FIG. 5, one is screwed on the underside of the basic body 14 and two others, as emerges especially from the plan view from FIG. 6, are screwed onto opposite sides of the basic body 14 on the side with regard to the underside, in fact on lateral projections 48 which are provided for this purpose and which have beveled locating surfaces onto which are screwed the joint ball sockets 46.

On the respectively other free end, which is not fastened on the basic body 14, each of the stabilizing elements 16 also has an additional lockable ball joint 45 of similar constructional design for articulated fastening on the lower housing half 12. Fastened on these three ball joints 45 by a plurality of screws is a fixing body 49 in each case via which the releasable connecting of the respective free end to the lower half 12 of the turbine housing is carried out.

The fixing body 49 of those two stabilizing elements 16 of which one free end is fastened on the basic body 14 on the side is designed in such a way in this case that a releasable fastening of the respective other end on the lower housing half 12 in the region of the parting joint 11 can be carried out by screw fastening. For this purpose, these two fixing bodies 49 have in each case a through-hole through which extends a threaded rod 22, similar to the releasable fastening of the basic body 14 on the lower housing half 12 in the region of the parting joint 11. In a totally similar way to the fastening of the basic body 13, the respectively other end of the threaded rod 22 extends through a through-hole which is provided in the lower housing half 12. Screwed onto the threaded rod 22 on both sides in each case is again a nut 23 and for the fastening of the stabilizing elements 16 on the lower housing half 12 is clamped against the fixing body 49.

Figure 11:
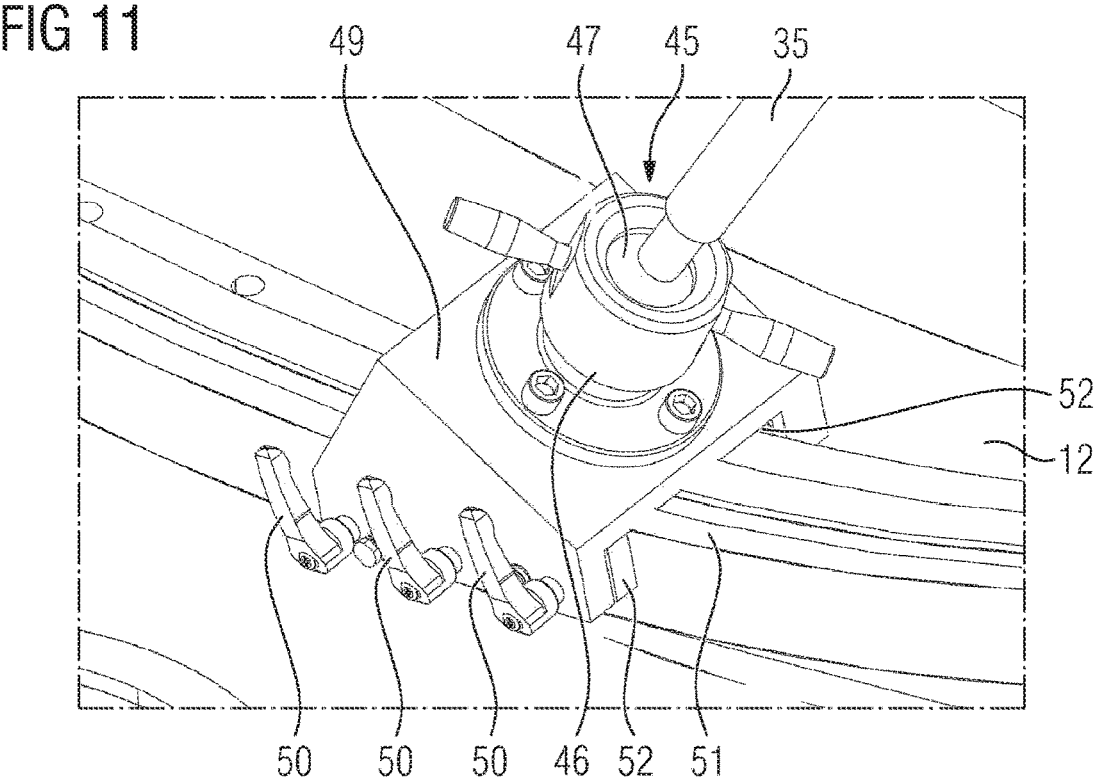
FIG. 11 shows a perspective partial view of the device from FIG. 4, which shows the fastening means on a free end of a stabilizing element in an enlarged view.

The fixing body 49 of the remaining, third stabilizing element 16, the free end of which is fastened on the underside of the basic body 14, is also designed in such a way that fastening of the other free end on the lower housing half 12 is possible by clamping. For this purpose, the fixing body 49 is of approximately U-shaped design and, as can easily be seen in the enlarged view of FIG. 11, has three clamping levers 50 by means of which three clamping screws, which extend through the wall of the fixing body 49 but are not visible in the Figure, can be rotated in and out in order to fasten the fixing body 49 by clamping on the lower housing half 12, specifically on a mounting 51, provided in this, for the stator blade carriers of the turbine.

The fixing body 49 for fastening by clamping has friction liners 52 in that region in which in the fastened state it is in contact with the lower housing half 12. The friction liners 52 are to be seen in FIG. 11. Friction liners 52 can also be provided on the two other fixing bodies 49, which are screwed on at the parting joint 11, on the underside of the fixing bodies 49 which is in contact with the parting joint 11 in order to ensure a particularly reliable retention.

By means of the three stabilizing elements 16, a particularly high degree of rigidity of the device 13 and consequently a particularly high degree of machining accuracy is achieved.

For collecting the material chips which are created during a machining process of the rotor, the machining device 13 also has a collection and suction device 53 which is fixed on the tool carrier 25. The collection and suction device 53 comprises a collecting container 54, which can be seen in particular in FIGS. 14 and 15, which is releasably fastened on the underside of the tool carrier 25 by means of toggle fasteners 55, and also an industrial vacuum cleaner, not visible in the Figures, which is fluidically connected to the collecting container 54 via a suction hose 56. The collecting container 54 and the suction hose 56 of the collection and suction device 53 can easily be seen in the enlarged views in FIGS. 14 and 15.

Figure 15:
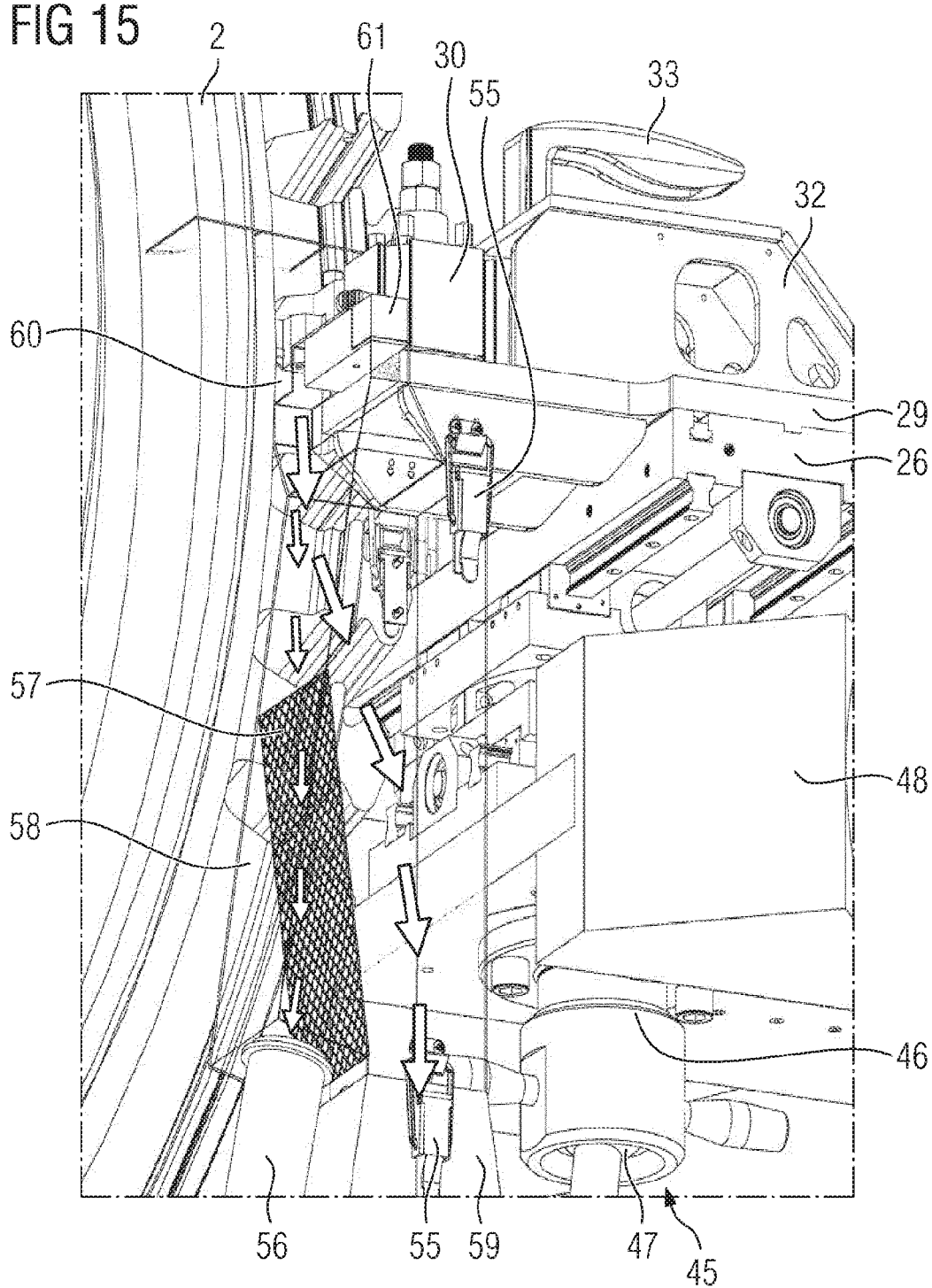
FIG. 15 shows a perspective partial view of the device from FIG. 4, which shows a part of the collecting container of the collecting and suction device obliquely from the bottom in an enlarged view.

The interior of the collecting container 54, via a screen 57 which can be seen in FIG. 15 in which the wall of the collecting container 54 is shown transparently, is divided into a region for coarser material chips and a region for finer material chips. The suction hose 56 opens into the region for finer chips, which extends beneath the screen 57. Via the screen 57, the effect of coarser material chips making their way into the suction hose 56 so that the vacuum cleaner is blocked on account of these, is prevented. The collecting container 54 is furthermore also designed in two parts, wherein the two parts 58 and 59 are also releasably interconnected via toggle fasteners 55. The lower part 59 in the Figures defines a collecting region for the coarser chips, which on account of the screen 57 cannot make their way into the suction hose 56, and which on account of the two-part design can be removed and emptied in a particularly convenient manner.

In FIG. 15, the path which coarser material chips travel through the collecting container 54 is indicated by means of larger arrows and the path of the finer chips is indicated by means of smaller arrows.

On its upper side, the collecting container 54 has an inlet opening 60 via which the material chips which result at the machining position make their way into the collecting container 54. The collecting container 54 is arranged in this case on the tool carrier 25 in such a way that the inlet opening 60 extends beneath the tool 24 and therefore beneath the machining position during operation of the device.

Figure 14:
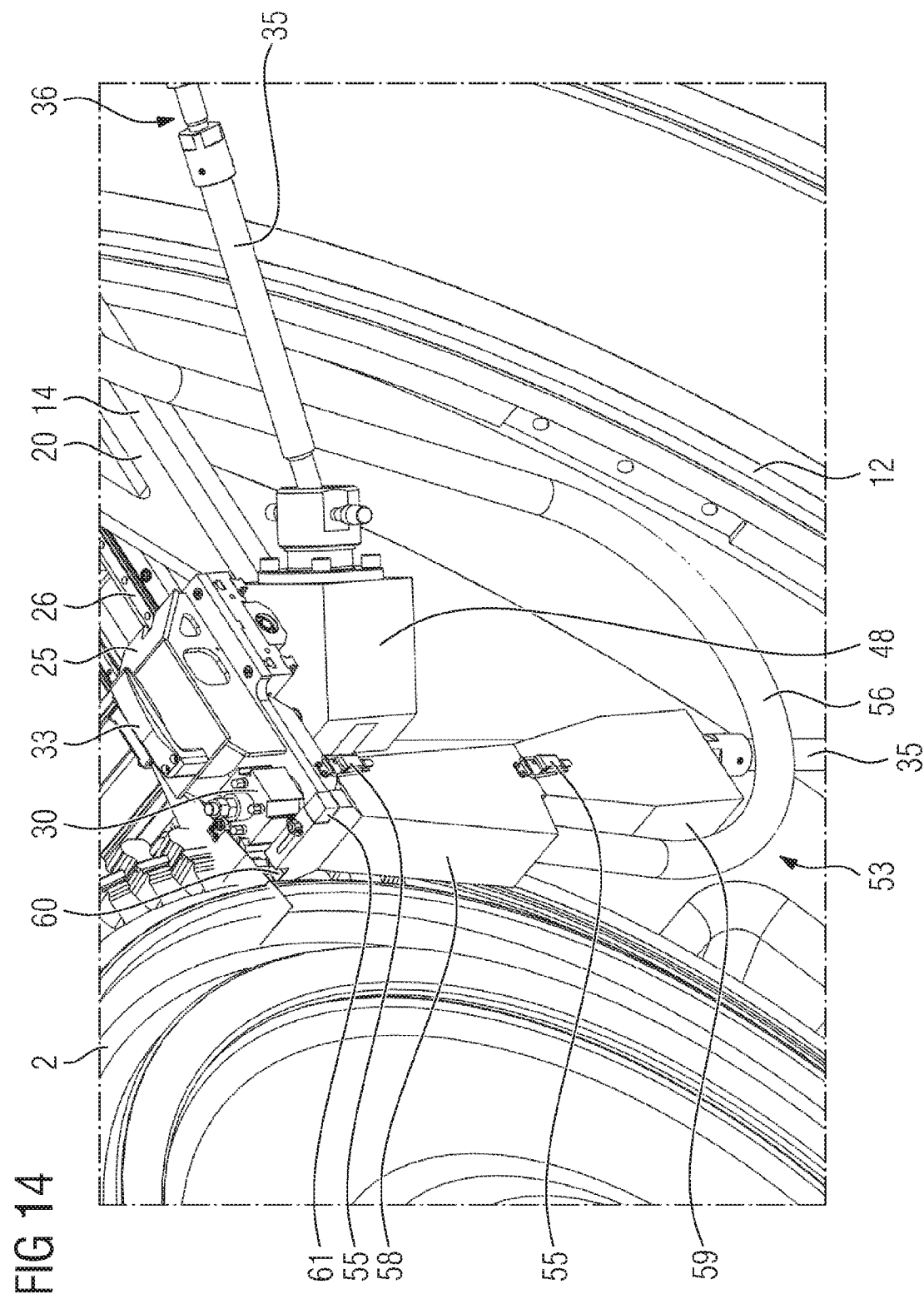
FIG. 14 shows a perspective partial view of the device from FIG. 4, which shows the tool carrier with the collecting and suction device, fastened thereon, for material chips which occur as a result of the machining in an enlarged view obliquely from the top.

The inlet opening 60 can be closed off by means of a slide 61 which can be particularly easily seen in FIGS. 14 and 15. In this case, the arrangement is found in such a way, the slide 61 especially being dimensioned in such a way, that if the inlet opening 60 is closed off by operation of the slide 61, a further inlet opening 60 of the same size is created on the opposite side which again lies beneath the end-cut turning tool 24 when the tool carrier 25 is installed in the tool mounting 30 at the other predetermined position. By means of the slide 60, the collecting device 53 can therefore be easily adapted to the respective tool position.

In order to bring the previously described machining device 13 into the installed state shown in the Figures, the basic body 14 is first of all releasably fastened by a user on the lower housing half 12 in the region of the parting joint 11 with the aid of the threaded rods 22. In order to enable easy accessibility of the turbine housing and easy installation of the machining device 13 according to the embodiments of the invention, a working platform, not visible in the Figures, was provided for this purpose in the lower region of the lower housing half 12, which platform can be accessed by the user.

After the fastening of the basic body 14, the three fixing bodies 49, on the free ends of the stabilizing elements 16 in the region of the parting joint 11, are fastened by screws on the lower housing half 12 or clamped on the mounting 51 for the stator blade carriers. The ball joints 45 on both ends of the stabilizing elements 16 ensure a particularly high degree of installation flexibility in the process. The ball joints 45 are then locked by screw fastening and the length of the stabilizing elements 16 is increased one after the other by rotating the first sleeve 37 of the clamping device 36 in order to uniformly apply compression stresses and to achieve a highest possible degree of rigidity of the entire construction. For this purpose, especially that end region of the basic body 14 which faces the rotor and on which is arranged the end-cut turning tool 24, can be held in position in a particularly reliable manner and a high degree of machining accuracy can be achieved.

The installation is carried out in this case according to the embodiments of the invention in such a way that in the installed state a tetrahedron, that is to say a particularly stable geometric shape, is spanned by the three rod-like stabilizing elements 16 and the basic body 14. In this case, that stabilizing element 16 which is connected to the underside of the basic body 14 is clamped on the lower housing half 12 by a mounting 51 in such a way that it includes an angle of approximately 10° with the vertical, as can easily be seen in FIG. 5, and the two other stabilizing elements 16, which are fastened on the basic body 14 on the side, are fastened in such a way that they include an angle of about 20° with the horizontal.

After the machining device 13 has been finally installed, machining of the rotor in situ can be carried out. For the protection of personnel, especially of the user operating the device, access to the turbine is initially temporarily blocked off by a mobile safety rail in this case.

For the machining, a region which is to be machined, which in the present case is an annular groove 7 in one of the wheel disks 2 or mini-disks 4 for accommodating the sealing plates 5 in each case, is scanned and measured by means of the laser measuring device 34 and the machining tool 24 is brought into position, that is to say into engagement with the annular groove 7. In this case, based on the indicated values of the measuring system on a separate screen, optional parameters are set in the CNC program. The rotor and therefore the wheel disk 2 or mini-disk 4 which is to be machined is then rotated with the aid of the available turning device of the shaft train of the turbine or a separate turning device and material is removed, specifically the annular groove 7 is cut deeper, in fact by 1.5 mm. If the turning device of the rotor which is available anyway is used, an additional working spindle is not required.

Following the mechanical aftermachining according to the embodiments of the invention of a first encompassing annular groove 7 on one side of for example a wheel disk 2, a second annular groove 7-if existing and necessary-for example on the other side of the wheel disk 2 in a mini-disk 4 or on another for example oppositely disposed wheel disk 2, can be machined without re-positioning of the entire machining device 13 on the lower housing half 12 being necessary. For this purpose, the tool holder 15 and therefore the end-cut turning tool 24 are removed from the tool mounting 30. The end-cut turning tool 24 is unscrewed from the tool holder 15 and the tool holder 15 is positioned at the second predetermined position on the tool mounting 30 by it being fitted on the second correspondingly designed region on the opposite side of the tool mounting 30. The end-cut turning tool 24 is again screwed on the tool holder 15 in such a way that its cutting edge points downward again. In this position, a further annular groove 7 on the same or another wheel disk 2 or mini-disk 4 is machined.

The tool holder 25 is then moved away from the rotor in the radial direction by means of the correspondingly oriented linear guide 26 and moved in the axial direction by the axially oriented linear guide 26 toward an adjacent wheel disk 2 or mini-disk 4 in order to aftermachine an annular groove 7, provided there for accommodating sealing plates 5, using the end-cut turning tool 24.

Figure 16:
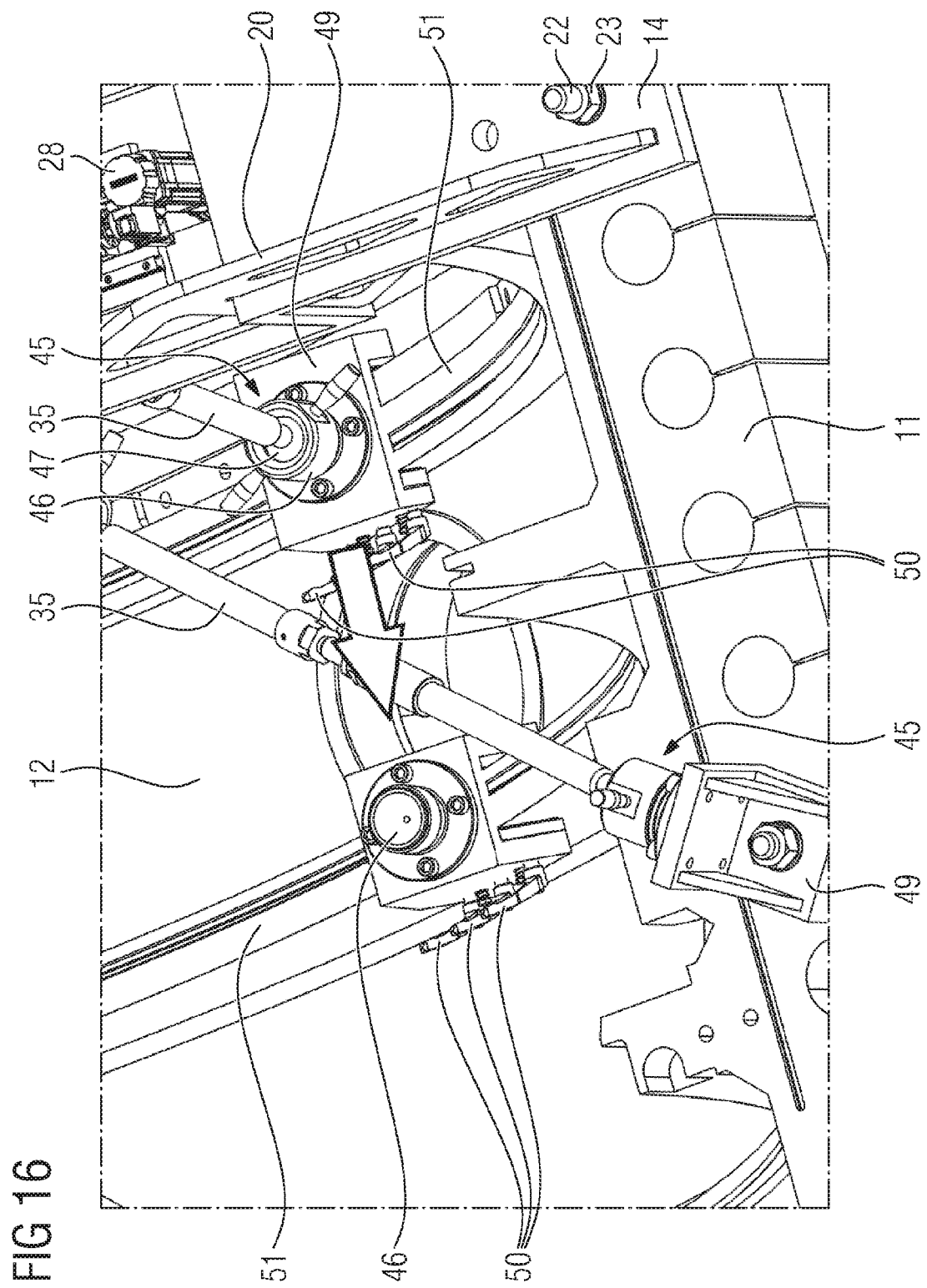
FIG. 16 shows a perspective partial view of the device from FIG. 4, which illustrates a change from one fixing body to another fixing body.

If on the turbine the encompassing annular grooves 7 are to be mechanically aftermachined in further non-adjacent wheel disks 2 or mini-disks 4 in the manner according to the embodiments of the invention, the fastening of the machining device 13 according to the embodiments of the invention is to be released, specifically both that of the basic body 14 and that of the three stabilizing elements 16 from the lower housing half 12, and be releasably re-fastened at another axial position which is then suitable for the machining of the annular grooves 7 of the further wheel disk 2 and/or mini-disk 4. The change of position of the fixing body 49 of the third stabilizing element 16, the free end of which is fastened on the underside of the basic body 14, from a position on the mounting 51 for the stator blade carriers of the turbine to another axially offset mounting 51, is indicated by an arrow in FIG. 16. In this case, the same fixing body 49 can be used or—especially if the fastening is required on a differently shaped mounting 52 of the lower housing half 12-a differently shaped fixing body 49 is used. For clamping on a mounting 52 with smaller of larger extent in the axial direction, for example a U-shaped fixing body 49 with smaller or larger width can be used. This is indicated in FIG. 16. The further fixing body 49, which is on the left in the Figure, is distinguished by a smaller width since it is fastened on a thinner mounting 51. For a particularly high degree of installation flexibility, a multiplicity of fixing bodies of different shape can be provided. The fixing bodies 49 can also be each provided with a suitable ball joint socket 46 so that a change from one fixing body 49 to another, which is indicated by the arrow in FIG. 16, can be easily be carried out by the ball head 47 being removed from the one joint ball socket 46 and inserted into the other. For an easy change, the joint ball sockets 46 can also have an upper part and a lower part which are releasably interconnected, and another fixing body 49, to which the change has to be carried out, can be provided only with a separate lower part.

If the machining device 13 according to the embodiments of the invention is to be used on a turbine with different dimensions, use can be made for example of stabilizing elements 16 the struts 35 of which are distinguished by a different length.

Figure 17:
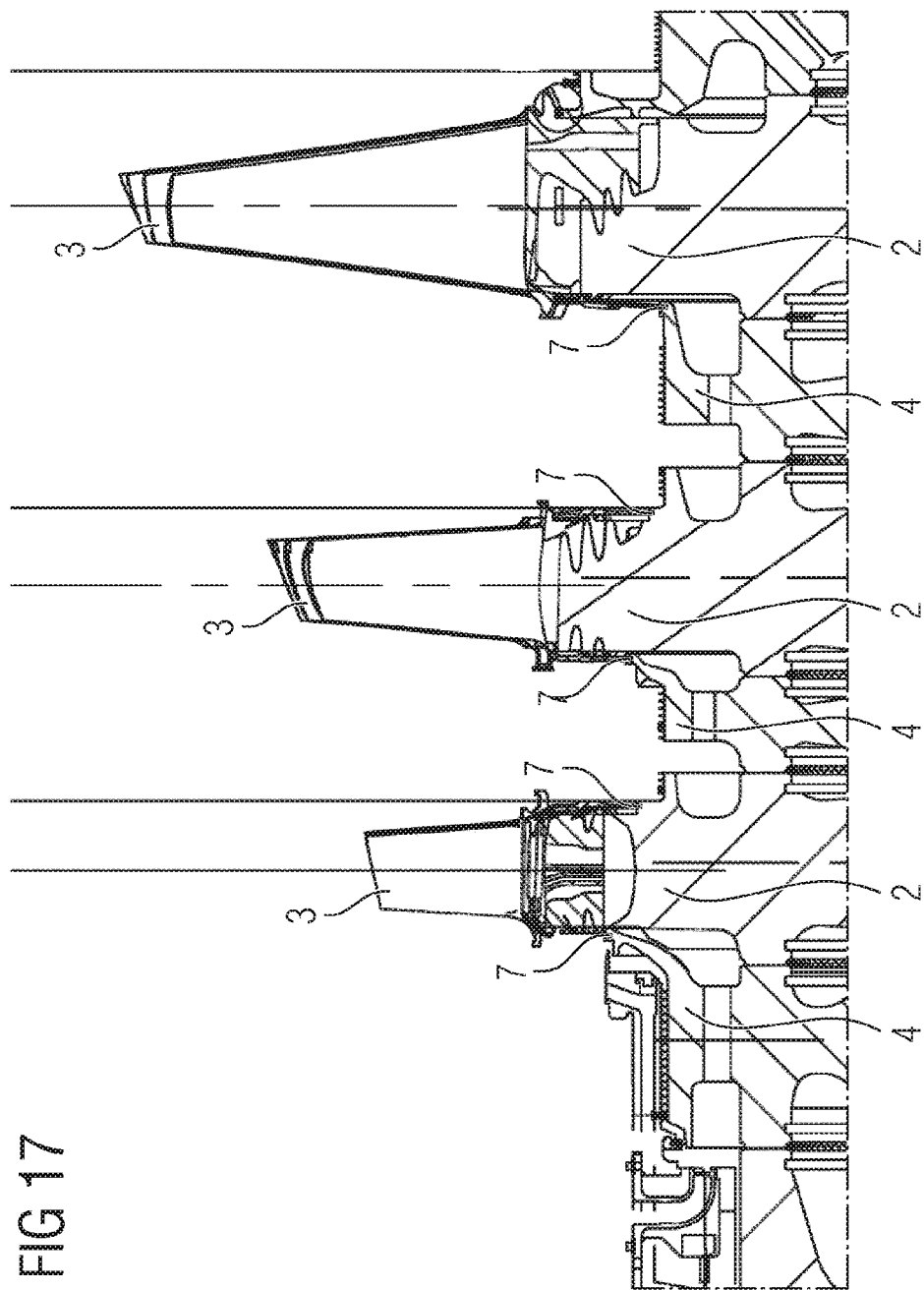
FIG. 17 shows a partial sectional view through the rotor which shows three of four stages.

In the aforesaid manner, for example five annular grooves 7 can be mechanically aftermachined on three wheel disks 2 and two mini-disks 4, wherein for the two annular grooves 7 on a wheel disk 2 and adjacent mini-disk 4 only the position of the end-cut turning tool 24 on the tool mounting 30 has to be changed, and for machining the annular grooves 7 on an adjacent wheel disk 2 only the position of the tool carrier 25 has to be changed and relocation of the entire machining device 13 is only necessary in the case of a changeover to a non-adjacent wheel disk 2 or mini-disk 4. To be seen in FIG. 17 are five annular grooves 7 of the turbine which for example are aftermachined in the manner according to the embodiments of the invention.

Following the aftermachining according to the embodiments of the invention of for example five annular grooves 7, which have been cut deeper by approximately 1.5 mm, according to the embodiments of the invention a sealing strip 5, consisting of metal and in its dimensions adapted to these grooves, is threaded in an encompassing manner into each of said annular grooves 7, as a result of which a reliable seal is achieved and consequently cooling air leakages in the region of the turbine are avoided or at least appreciably reduced. A sealing strip threaded into an annular groove 7 can be gathered from FIG. 3.

It is understood that the machining device 13 according to the invention and the method according to the invention for machining a rotor can also be used for other machining operations which differ from the previously exemplarily described deeper cutting of annular grooves 7 for accommodating sealing plates 5.

Although the invention has been fully illustrated and described in detail by means of the preferred exemplary embodiment, the invention is not limited by the disclosed examples and other variations can be derived therefrom by the person skilled in the art without departing from the extent of protection of the invention.

The invention claimed is:

1. A machining device for in situ a rotor arranged in a turbine housing which consists of two parts, thereby forming a parting joint, with an upper housing half removed, the machining device comprising:
    a basic body which has fastening means for a releasable fastening of the basic body on a lower housing half in a region of the parting joint;
    at least one tool holder for accommodating at least one machining tool which is fastened directly or indirectly on the basic body and can be aligned, along at least two axes, relative to the basic body; and
    a plurality of telescopically designed stabilizing elements, which can be locked in different length adjustments in a stepless manner, one free end of which in each case is fastened in an articulated manner on the basic body and which on their other free ends are provided with additional fastening means which are designed in such a way that the free ends can be fastened in a releasable and articulated manner on the lower half of the turbine housing.

2. The device as claimed in claim 1, wherein the plurality of telescopically designed stabilizing elements are of rod design.

3. The device as claimed in of claim 1 wherein the plurality of telescopically designed stabilizing elements are fastened in an articulated manner on an end region of the basic body and the fastening means are provided for the releasable fastening of the basic body on the lower housing half in the region of the parting joint on an end region of the basic body which lies opposite the end region.

4. The device as claimed in claim 1, wherein provision is made for three stabilizing elements and one free end of one stabilizing element is fastened in an articulated manner on an underside of the basic body and of the two other stabilizing elements one free end in each case is fastened in an articulated manner on the basic body on the side with regard to the underside, wherein the free ends of the two other stabilizing elements are fastened especially on oppositely disposed sides of the basic body.

5. The device as claimed in claim 4, wherein an additional fastening means of the stabilizing element the free end of which is fastened in an articulated manner on the underside of the basic body are designed so as to enable a releasable fastening on the lower housing half by clamping, and/or the additional fastening means of those stabilizing elements the free ends of which in each case are fastened in an articulated manner on the basic body on the side are designed so as to enable a releasable fastening on the lower housing half in the region of the parting joint by screw fastening.

6. The device as claimed in claim 1, further comprising a laser measuring device which is fastened and/or formed directly or indirectly on the basic body and can be aligned relative to the basic body along at least two axes, in order to scan and especially to measure a groove, on the rotor which is to be machined.

7. The device as claimed in claim 6, wherein the laser measuring device is fastened on the tool carrier.

8. The device as claimed in claim 1 wherein a suction device is provided for material chips which occur as a result of the machining and which comprises at least one collecting container and/or a vacuum cleaner.

9. The device as claimed in claim 8, wherein the collecting container of the collecting and/or suction device is fastened on the tool carrier.

10. The device as claimed in claim 1, further comprising a tool carrier, which is fastened directly or indirectly on the basic body and can be aligned, at least two axes, relative to the basic body on which the tool carrier is arranged.

11. The device as claimed in claim 1,
    wherein the basic body is distinguished by a Z-shape,
    with two plate sections which are oriented at least in the main parallel to each other,
    are offset to each other, and are interconnected via a plate connecting section which is oriented at least in the main orthogonally to the two plate sections, and reinforcing members are especially provided on the basic body on the upper side and/or lower side.

\* \* \* \* \*